United States Patent [19]

Kinard

[11] 4,172,612

[45] Oct. 30, 1979

[54] CAR CARRIER WITH TWO-STAGE TELESCOPIC HYDRAULIC CYLINDERS

[75] Inventor: Daniel P. Kinard, Snellville, Ga.

[73] Assignee: Bankhead Enterprises, Inc., Atlanta, Ga.

[21] Appl. No.: 924,935

[22] Filed: Jul. 17, 1978

[51] Int. Cl.² .......................... B62D 39/00; F01B 7/20
[52] U.S. Cl. ....................................... 296/1 A; 92/152
[58] Field of Search ................... 296/1 A; 92/151, 152

[56] References Cited

U.S. PATENT DOCUMENTS

| 3,104,127 | 9/1963 | Swartzwelder | 296/1 A |
| 3,877,349 | 4/1975 | Schindel | 92/152 |

*Primary Examiner*—Philip Goodman
*Attorney, Agent, or Firm*—Jones, Thomas & Askew

[57] ABSTRACT

A two-stage double acting telescopic hydraulic cylinder includes two fluid ports formed in the external cylinder, one port for receiving fluid to distend both cylinder stages and the other port for receiving fluid to retract both cylinder stages. The cylinders are used in combination with car carrying trailers.

5 Claims, 3 Drawing Figures

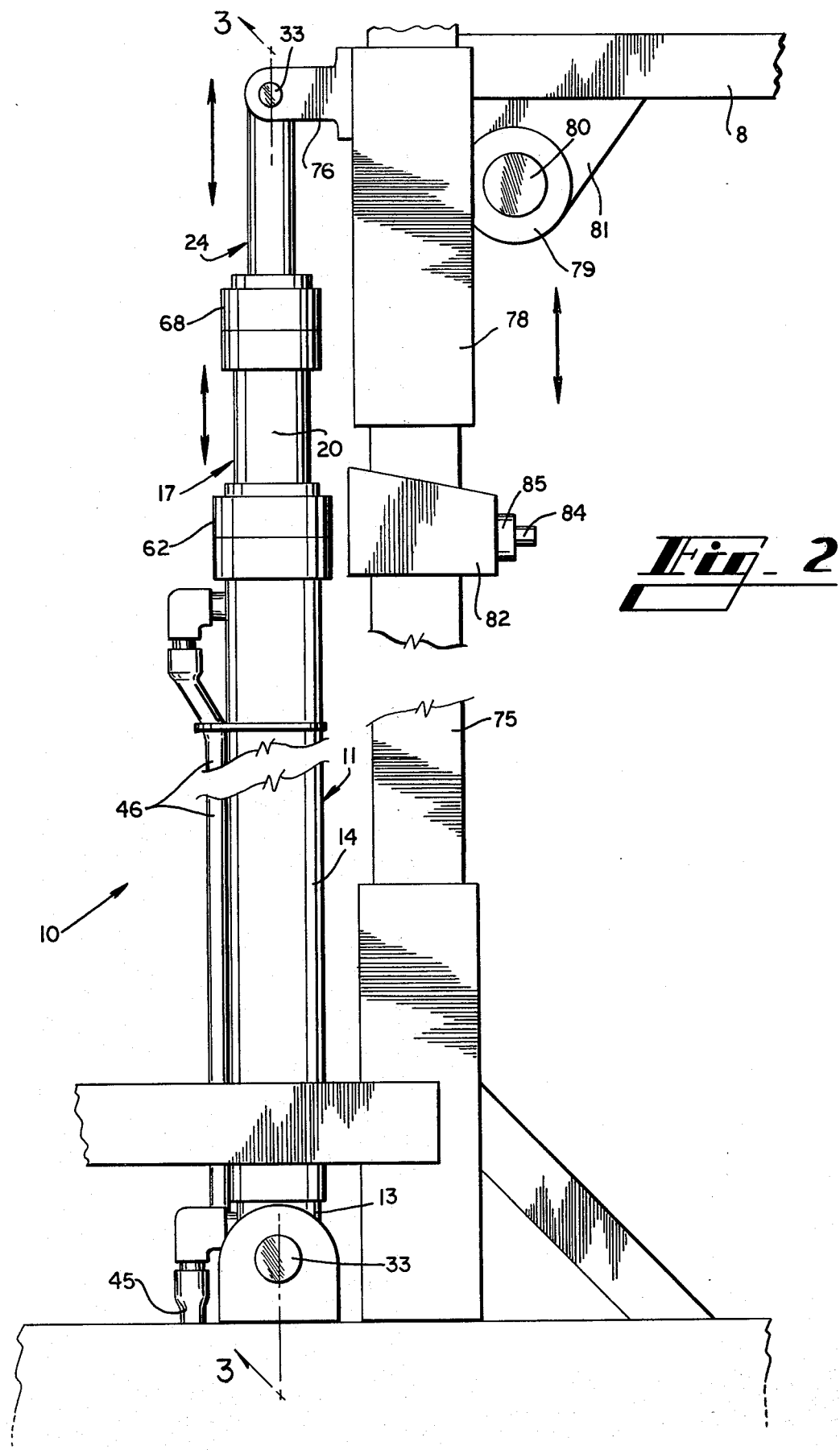

CAR CARRIER WITH TWO-STAGE TELESCOPIC HYDRAULIC CYLINDERS

BACKGROUND OF THE INVENTION

The present invention relates generally to two-stage telescopic hydraulic cylinders for use with car carriers, and more particularly to a system of channeling hydraulic fluids through the external cylinder of a multiple stage cylinder so as to accomplish distension and retraction of both cylinder pistons without the use of a third hydraulic line and to eliminate the presence of the third hydraulic line from the car carrier.

Two-stage telescopic hydraulic cylinders usually comprise an outer housing and two ram elements, with each ram element including a piston. The ram elements operate in a telescoping manner relative to one another and relative to the outer housing. The first ram element moves in and out of the housing and the second ram element moves in and out of the first ram element. The purpose of using the two-stage cylinder instead of a single stage cylinder is to achieve a long arm movement from a relatively short cylinder length.

To distend both ram elements of a typical prior art two stage telescopic cylinder, hydraulic fluid is applied to both pistons from the base end of the outer cylinder body or housing. The fluid is delivered by hydraulic lines or tubing from a hydraulic fluid supply to a single entry port in the base of the cylinder housing and channeled internally to contact and apply pressure against the rear faces of both of the two pistons.

To retract the ram elements, fluid must be applied to the opposite, outer faces of the two pistons. Since, in their distended positions, the pistons are located at the outer end of the housing and at the outer end of the first ram element, it is necessary to apply hydraulic fluid to the outer ends of both the housing and the first ram element. Typical prior art two-stage cylinders accomplished the application of hydraulic fluid to the outer surfaces of the two pistons by placing a fluid entry port in both locations, one at the outer end of the housing and one at the outer end of the first ram element. These two fluid entry ports, which represent the second and third ports of the two-stage hydraulic cylinder, are connected to the hydraulic fluid supply by flexible hydraulic lines or tubing, extending along the exterior of the cylinder.

The external hydraulic line connected to the port at the end of the first ram element must be long enough to reach the port when the ram element is both fully distended and fully retracted. These hydraulic lines are sometimes wound around the external surfaces of the cylinder like a coil spring so as to progressively expand and retract with the expansion and retraction of the cylinder, but the coiled configuration of the hydraulic lines requires additional length of tubing. Another hydraulic line arrangement provided for two-stage cylinders includes a coil tension spring connected to the hydraulic line and to some stationary object to bias the hydraulic line to a retracted, out of the way, position, but this requires the additional spring element and a relatively long hydraulic line. In all of the two-stage telescopic hydraulic cylinders which require a hydraulic line to move with the movement of the ram elements, the hydraulic lines are exposed and therefore are subject to damage by abrasion and deterioration and are sometimes cut or ruptured by tangling with other objects.

One use of two-stage telescopic hydraulic cylinders is with car carrying trailers, in which a trailer carries trucks and cars in two or more levels on public roads. The upper platforms of the typical trailer which carry the upper level of cars must be lowered to receive the cars and raised a substantial distance so that cars can be loaded on the lower level of the trailer. It is desirable to use the multiple-stage hydraulic cylinders on the trailers to include the desired long reach feature of the cylinders, but the presence of the cumbersome external hydraulic lines that must move with the ram elements is a major problem because the lines get in the way of the trailer operator, are sometimes caught in the elements of the trailer or in the vehicles moving on or off the trailer, and are subject to abrasion and deterioration during use of the trailer.

SUMMARY OF THE INVENTION

Briefly described, the present invention comprises a car carrying trailer that includes a two-stage telescopic hydraulic cylinder which eliminates the usual external hydraulic line extending to the outer end of the first ram element and includes an internal fluid passage network which channels hydraulic fluid through the outer cylinder housing and through the casing of the first ram element to retract the second ram element. The hydraulic cylinder of the present invention utilizes only two fluid entry ports rather than the usual three ports to distend and retract the ram elements, one port for distention and one for retraction of both ram elements. The two ports are both formed in the outer cylinder housing and, therefore, external hydraulic lines supplying fluid to these ports can be cut to exact lengths and attached rigidly against the cylinder housing and out of harms way.

When the hydraulic cylinder disclosed herein is used in combination with a car carrying trailer, there are no cumbersome external fluid lines connected to the telescoping ram elements of the cylinders and the cylinders and other elements of the trailer form a durable trailer structure.

It is therefore an object of the present invention to provide a two-stage double acting telescopic hydraulic cylinder which does not require a fluid entry port formed in the movable ram elements.

Another object of this invention is to provide a two-stage hydraulic cylinder which has a long reach, which is durable in operation and which is inexpensive to manufacture and to maintain.

Another object of this invention is to provide a ram element for use in a two-stage telescopic hydraulic cylinder which includes a fluid passage network formed within the ram arm for channeling fluid along the length of the ram arm.

Another object of this invention is to provide a car carrying trailer which includes multiple stage hydraulic cylinders which are free of external hydraulic lines that must move with the movable ram elements.

These and other objects, features and advantages of the present invention will become apparent upon reading the following specification, when taken in conjunction with the accompanying drawings, and the appended claims.

BRIEF DESCRIPTION OF THE DRAWINGS

FIG. 2 is a broken side view of the two-stage telescopic hydraulic cylinder and a portion of the car carrier.

DETAILED DESCRIPTION

Figure 1:
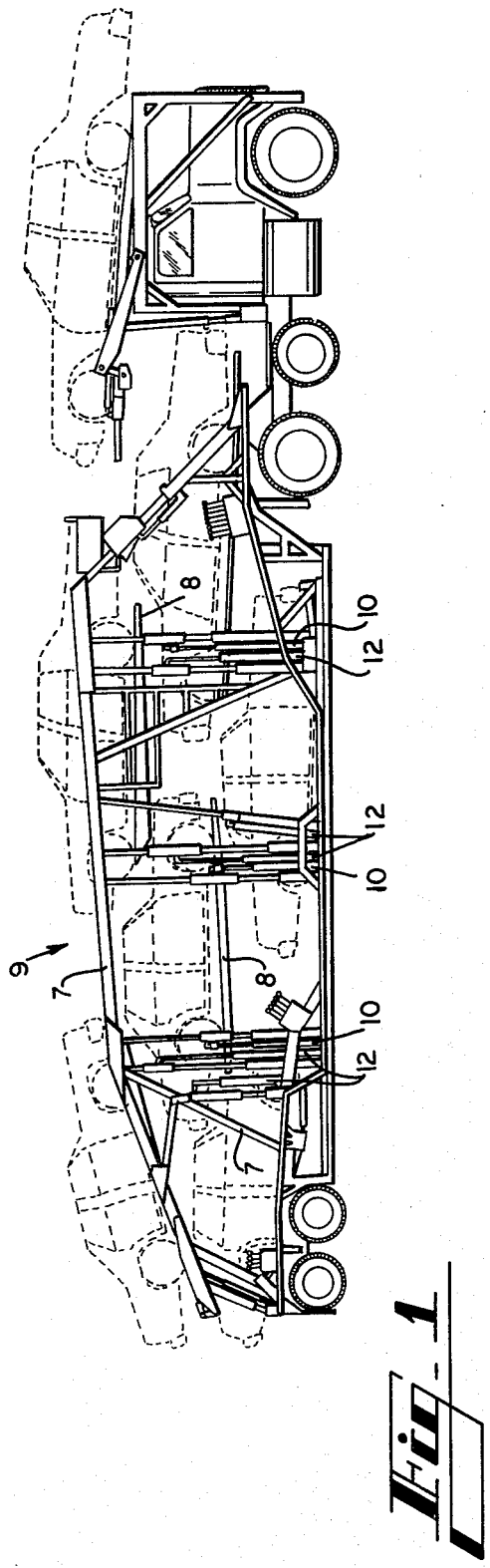
FIG. 1 is a schematic side view of a car carrier outfitted with conventional single stage hydraulic cylinders and the two-stage telescopic hydraulic cylinders of the present invention.
Figure 3:
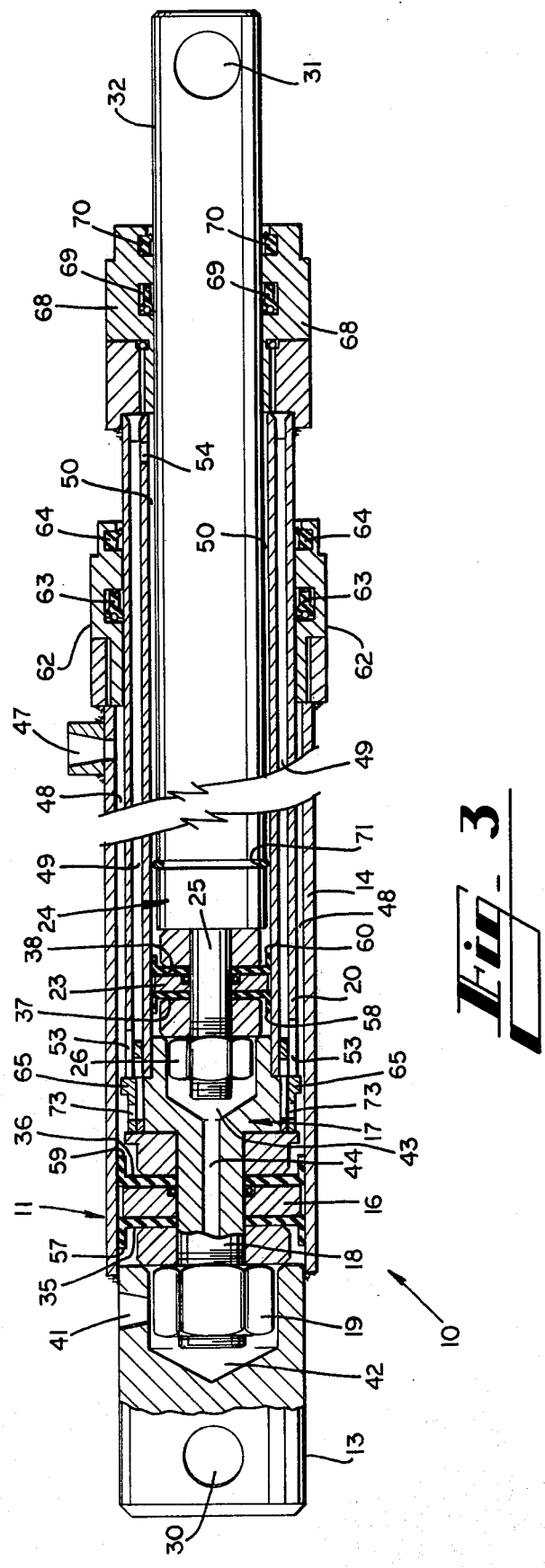
FIG. 3 is a detailed sectioned view, with a portion broken away, of the two-stage telescopic hydraulic cylinder illustrated in FIG. 2.

Referring now in more detail to the drawings, in which like numerals represent like components throughout the several views, FIG. 1 shows a car carrying trailer 9 of the type used to carry automobiles and small trucks in a double deck arrangement. The car support platforms 8 of the trailer 9 which support the cars are moved up and down on the trailer framework 7 by hydraulic cylinders, such as double acting two-stage telescopic hydraulic cylinders 10 and double acting single-stage telescopic hydraulic cylinders 12. As illustrated in detail in FIG. 3, the two-stage double acting telescopic hydraulic cylinder 10 of the present invention comprises an outer cylindrical housing 11 which includes a base end 13 and a cylindrical, hollow casing 14 extending from the base end 13. A first piston 16 is received within the hollow casing 14 of housing 11 and is slidable axially, inwardly and outwardly, through the casing 14 of the housing 11. A first ram element 17, the first stage telescoping cylinder, is telescopically inserted into the casing 14 of the housing 11 and has a shaft portion 18 by which the first ram element 17 is mounted to the first piston 16 and fastened there by a lock nut 19. The first ram element 17 also includes an elongated annular casing 20 extending from the lower shaft portion 18 which defines a hollow cavity and into which is slidably received a second piston 23. The second piston 23 is movable axially inwardly and outwardly, through the annular casing 20 of the first ram element 17. A second ram element 24, the second stage telescoping cylinder, is telescopically inserted into the annular casing 20 of the first ram element 17 and has a lower shaft portion 25 by which the second ram element 24 is mounted to the second piston 23 and fastened there by a lock nut 26.

The first piston 16 has an inner face 35 directed toward the base end 13 of the housing 11 and an oppositely directed outer face 36. The second piston has a similarly oriented inner face 37 and an oppositely oriented outer face 38.

A bore hole 30 is located in the base end 13 of the outer cylindrical housing 11 and a second bore hole 31 located at the tip end 32 of the second ram element 24. The hydraulic cylinder assembly 10 is pivotally mounted to the car carrier framework by pins 33 extending through the bore holes 30, 31.

A first pocket 42 is formed within the outer housing 11 at the innermost end of the hollow casing 14. This first pocket 42 serves as a "seat" for the lock nut 19 fastened to the lower shaft portion 18 of the first ram element 17 when the first piston 16 and first ram element are retracted to their fully inward position. A second pocket 43 is formed within the first ram element 17 at the innermost end of the annular casing 20 of the first ram element 17. This second pocket 43 serves as a "seat" for the lock nut 26 fastened to the lower shaft portion 25 of the second ram element 24 when the second piston 23 and second ram element 24 are retracted to their fully inward position.

The cylinder assembly 10 has a first fluid channeling system for directing hydraulic fluid supplied by lower hydraulic line 45 from a fluid supply (not shown), to the inner faces 35, 37 of the two pistons 16, 23 to force the pistons 16, 23 and the attached ram elements 17, 24 outwardly within the respective casings 14, 20. The first fluid channeling system includes a first fluid entry port 41 formed generally at the base end 13 of the outer cylindrical housing 11, the first pocket 42, a duct 44 extending axially through the shaft portion 18 of the first ram element 17, and to the second pocket 43.

A second fluid channeling system directs hydraulic fluid, supplied by hydraulic line 46 from a fluid supply (not shown), to the outer faces 36, 38 of the two pistons 16, 23 to force the pistons 16, 23 and the attached ram elements 17, 24 inwardly within the respective casings 14, 20. This second fluid channeling system includes a single second fluid entry port 47 formed in the wall of the hollow casing 14 of the outer cylindrical housing 11 and a fluid passage network comprising a first annular chamber 48 defined between the casing 14 of the outer cylindrical housing 11 and the casing 20 of the first ram element 17, a second annular chamber 49 formed within the casing 20 of the first ram element 17, a third annular chamber 50 defined between the second ram element 24 and the casting 20 of the first ram element 17, a fluid passage opening 53 connecting the first and second annular chamber 48, 49 and a fluid passage outlet 54 connecting the second and third annular chambers 49, 50. The first and third annular chambers 48, 50 vary in length depending upon the relative positions of the ram elements 17, 24. The second annular chamber 49 is an internal passage of constant length connecting the opening 53 with the opening 54.

A first pack head 62 is attached to the outer cylindrical housing 11 encircling the end of the outer hollow casing 14 opposite the housing base end 13. This first pack head includes a rod seal 63 and rod wiper 64 for wiping the first ram element 17 passing in and out of the housing 11. A first stop ring 65 is provided at the lower end of the first ram element 17 to contact the first pack head 62 and limit outward movement of the ram element 17.

A second pack head 68 is attached to the first ram element 17 encircling the end of the hollow casing 20 opposite the end attached to the first piston 16. This second pack head 68, like the first head 62, includes a rod seal 69 and rod wiper 40 interacting with the second ram element 24. A second stop ring 71 is provided at the lower end of the second ram element 24 to contact the second pack head 68 and limit the outward movement of the second element 24.

The second fluid entry port 47 is located near the first pack head 62 so as to always remain to the outside of the first piston outer face 36 when that piston 16 moves outwardly. In the disclosed embodiment, the fluid passage opening 53 through annular casing 20 is located to the outside of the first stop ring 65. Due to the relative positioning of the stop ring 65 and the second entry port 47, fluid flow is restricted from port 47 to passage 53 when the ram element 17 is distended and the stop ring 65 is moved flush against the first pack head 62. To insure fluid flow to the second annular chamber 49, an auxilliary fluid conduit 73 is formed in the first ram element 17 inwardly of the stop ring 65 and connecting the first and second annular chambers 48, 49.

The second annular chamber 49 extends the length of the first ram element casing 20 between the fluid passage opening 53 and fluid passage opening 54. As a result of the particular passage arrangement of the opening 53, second chamber 49 and opening 54, fluid can be moved within the casing 20 of the first ram element 17, to the end of the first ram element 17 near the pack head 68 without the use of a third externally-opening fluid entry port formed in the first ram element 17 and without the use of an external hydraulic line.

In operation, the two ram elements 17, 24 are telescopically distended by directing hydraulic fluid under pressure through the first fluid entry portal 41 and into the first pocket 42. Fluid entering the first pocket 42 builds up behind and applies pressure to the inner face 35 of the first piston 16 thus forcing the piston 16 outward. The fluid building up behind the first piston 16 also passes through the duct 44 and into the second pocket 43 where it builds up behind and applies pressure to the inner face 37 of the second piston 23 thus forcing the piston 23 outward. Pressure against the piston inner faces 35, 37 within the first fluid channeling system is maintained by piston seals 57, 58 sealing the gaps between the pistons 16, 23 and their respective casings 14, 20.

The two ram elements 17, 24 are telescopically retracted by directing hydraulic fluid under pressure through the single second fluid entry port 47 and into the fluid passage network. Fluid flowing through the second port 47 enters the first annular chamber 48, builds up in front of and applies pressure to the outer face 36 of the first piston 16 thus forcing the piston 16 inward. The fluid building up in front of the first piston also passes through the fluid passage opening 53 into the second annular chamber 49 which channels the fluid to the fluid passage outlet 54 through which fluid enters the third annular chamber 50. Fluid entering the third annular chamber 50 builds up in front of and applies pressure to the outer face 38 of the second piston 23 thus forcing the second piston 23 inward. Pressure against the piston outer faces 36, 38 within the second fluid channeling system is maintained by piston seals 59, 60 sealing gaps between the pistons 16, 23 and their respective casings 14, 20.

The lower hydraulic line 45 of each hydraulic cylinder (FIG. 2) is attached to the outer cylindrical housing 11 at a position adjacent the bore hole 30 of the base end 13, and the hydraulic line 46 extends up the cylindrical housing parallel to the length of the cylinder and is tied to the cylinder so that the line 46 is substantially immobile with respect to the cylinder and does not protrude so as to obstruct or become entangled in or wear against other objects.

The base of each hydraulic cylinder is attached to the framework 7 of the trailer 9 by a pivot pin 33 extending through hole 30, and the cylinder extends parallel to and in juxtaposition with a stanchion 75. The upper protruding end of the second ram element 24 is connected by pin 33 extending through hole 31 of the ram element and through an aligned hole in the clevis 76 of platform sleeve 78. The sleeve 78 has bearing socket 79 attached to it, and pin 80 extends through the socket and through an aligned hole in the socket 81 of car platform 8. Stop sleeve 82 is positioned below platform sleeve 78, and pin 84 is movable through its support 85 in stop sleeve 82 into any one of a series of holes formed in stanchion 75, to limit the downward movement of the car platform 8, to prevent the platform 8 or a car supported thereon from engaging a car located below.

While this invention has been described in specific detail with particular reference to a preferred embodiment thereof, it will be understood that variations and modifications can be effected within the spirit and scope of the invention as described hereinbefore and as defined in the appended claims.

What is claimed is:

1. A car carrying trailer for transporting a plurality of cars and the like in a double deck arrangement comprising a framework, and a plurality of car support platforms mounted on said framework, the combination therewith of a plurality of double acting two stage telescopic hydraulic cylinders mounted to said framework and connected to said platforms, said hydraulic cylinders each comprising an outer cylindrical housing comprising a closed base at one end and an opening at its other end, a first ram element reciprocatably received in and protruding in one direction from the open end of said cylindrical housing with a first piston mounted on its inner end and defining an opening at its other end, said first ram element including a double walled cylindrical housing and said first piston defining a fluid passage therethrough, a second ram element received in and protruding in said one direction from the open end of said double walled cylindrical housing of said first ram element with a second piston mounted on its inner end, said outer cylindrical housing defining a first port in its closed base whereby fluid pressure through said first port communicates with said first piston and through said first piston to said second piston to distend said first ram element from said outer cylindrical housing and said second ram element from said double walled cylindrical housing of said first ram element, said outer cylindrical housing defining a second port adjacent its open end, said double walled cylindrical housing of said first ram element defining a first port through its outer wall at its inner end and a second port through its inner wall at its outer end whereby fluid pressure through said second port of said outer cylindrical housing communicates with said first piston and through said first and second ports of said double walled cylindrical housing of said first ram element with said second piston to retract said first ram element into said outer cylindrical housing and said second ram element into said double walled cylindrical housing of said first ram element.

2. In combination, a car carrying trailer including a framework with a plurality of stanchions positioned along opposite sides thereof, a plurality of car support platforms connected to and movable along the lengths of said stanchions, two-stage double acting hydraulic cylinders mounted parallel to and in juxtaposition with said stanchions, each of said hydraulic cylinders comprising an elongated outer cylindrical housing mounted at one end on said framework, a hollow first ram element telescopically received in said outer housing and including an elongated annular casing defining an elongated inner cavity, said first ram element being mounted to a first piston and movable with said first piston inwardly and outwardly within said elongated outer cylindrical housing, a second ram element telescopically received in the inner cavity of said elongated annular casing and protruding from said inner cavity and connected at its protruding end to a car support platform, said second ram element being mounted at its inner end to a second piston and movable with said second piston inwardly and outwardly within the inner cavity of said elongated annular casing, said first and second pistons each including an inner and outer face, and a first fluid entry port defined in said outer cylindrical housing for supplying hydraulic fluid to the inner faces of both pistons to force both pistons outwardly, a piston retraction means for moving both pistons inwardly comprising a second fluid entry port defined in said outer cylindrical housing, a stop ring mounted on and movable with said first ram element from one side to the other side of said second fluid entry port, and fluid passage means connecting said second fluid entry port on both sides of said stop ring to said outer faces of both said first and second pistons for directing the fluid from said second fluid entry port to said outer faces, said fluid passage means including an internal passage formed within said first ram element for channeling the fluid along the length of said first ram element whereby the car support platforms can be raised and lowered by said hydraulic cylinders.

3. The cylinder of claim 2 and wherein said fluid passage means comprises:

a first annular chamber defined at its outer periphery by said outer cylindrical housing and at its inner periphery by said annular casing of said hollow first ram element, said fluid entry port opening into said first annular chamber, said internal passage of said first ram element comprising a second annular chamber defined within said annular casing;

at least one fluid passage opening connecting said first annular chamber with said second annular chamber;

at least one fluid passage outlet opening said second annular chamber and with said inner cavity of said first ram arm and with said outer face of said second piston, whereby said second fluid entry port, first annular chamber, fluid passage opening, second annular chamber and fluid passage outlet interrelate to form a fluid passage through which fluid communicates to the outer face of at least one of said first and second piston regardless of the location of the pistons within the outer cylindrical housing and said first ram element inner cavity.

4. In combination, a car carrying trailer including a framework with upright support stanchions, car support platforms connected to and movable along the lengths of said stanchions, two-stage double acting hydraulic cylinders each including an elongated outer cylindrical housing with one end portion mounted on said framework, a first piston including an inner and outer face movable within said housing, a hollow ram element mounted to and movable with said first piston and including an elongated annular cylindrical casing, a second piston including an inner and outer face movable within said hollow ram element, a second ram element mounted to and movable with said second piston and protruding from said hollow ram element and connected at its protruding end to a car support platform, a first fluid passage defined within said outer cylindrical housing and within said hollow ram element for communicating hydraulic fluid to said inner faces of both said pistons, a second fluid passage defined by said outer cylindrical housing, said hollow ram element and said second ram element for communicating hydraulic fluid to said outer faces of both said pistons, said second fluid passage including an internal passage formed within said annular casing of said hollow ram element for channeling the fluid along the length of said casing.

5. In a two-stage double acting telescopic hydraulic cylinder of the type including an outer cylindrical housing, a first ram element telescopically received through one end of said outer cylindrical housing and defining an inner cylindrical housing, and a second ram element telescopically received through one end of the inner cylindrical housing of said first ram element, the improvement therein of the inner cylindrical housing of said first ram element comprising a double walled housing with concentric inner and outer cylindrical walls defining an annular space, a stop ring extending about said outer wall, a port in said outer wall at one end of said double walled housing on one side of said stop ring, a port in said outer wall at said one end of said double walled housing on the other side of said stop ring, and a port in said inner wall at the other end of said double walled housing, whereby a fluid passage is formed from outside of and at one end of said first ram element from both sides of the stop ring, through the annular space and to the inside of and at the other end of said first ram element.

* * * * *